Patented Aug. 6, 1929.

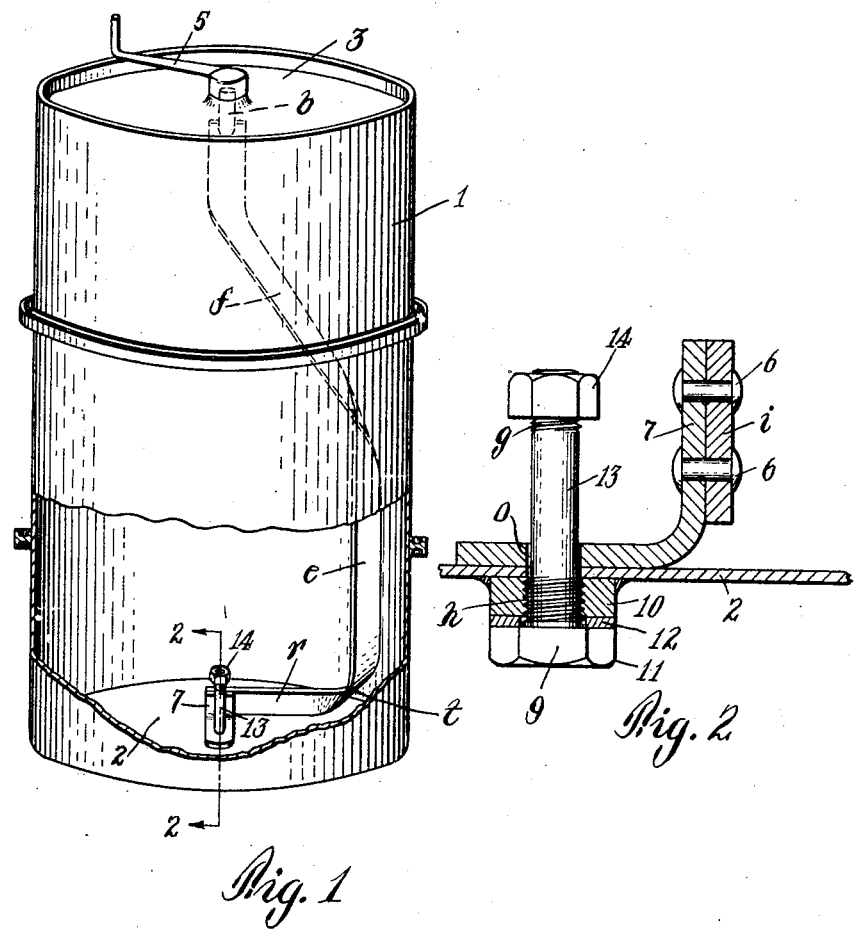

1,723,022

UNITED STATES PATENT OFFICE.

CHARLES E. FARRINGTON, OF PHOENIXVILLE, PENNSYLVANIA.

AGITATOR FOR DRUMS OR THE LIKE.

Application filed October 7, 1926. Serial No. 139,966.

This invention relates to agitators for drums or barrels wherein paints or other liquid suspensions or mixtures may be confined, and of the general type shown and described in my Letters Patent No. 1,336,830, dated April 13, 1920.

The agitator described in this patent comprises a radial arm revoluble about an axis substantially coincident with the axis of the drum and in an approximately horizontal plane parallel with and adjacent to the bottom. The inner end of the arm is pivoted on a stud secured to the bottom. As the practice of cleaning a drum for re-use is to tumble a long, heavy chain therein, the chain is likely to become entangled in the stud and become less effective in its action and also to wear out the stud and thus require its renewal.

The present invention has for one of its objects to provide a pivot which may be readily removed during cleaning, thus obviating obstruction to the action of the cleaning chain. Another object is to provide a pivot which, when removed, leaves a peep-hole for inspecting the drum during cleaning, without necessitating the removal of the chain.

On the accompanying drawing,

Figure 1 represents in front elevation a drum with its sides partly broken away to show the agitator and the improved pivot.

Figure 2 represents a detailed section on the line 2—2 of Figure 1.

Referring to the drawing, 1 indicates as a whole the drum with which an agitator is assembled. The agitator has an arm $r$, rotatable about an axis substantially coincident with the axis of the drum, in an approximately horizontal plane parallel with and adjacent to the bottom 2. Preferably, the agitator consists of a thin, rigid blade which, in addition to the arm portion $r$ which extends radially outwardly from the axis toward the side wall of the drum, has a lower, vertical portion $e$, and an upper, twisted portion $f$, the extremity $b$ of which passes through the top 3 and is engaged by a detachable handle 5, by which the agitator may be rotated. The lower portion $e$, as shown, is formed as a continuation of the outer end of the arm $r$ by a bend or twist $t$. These features are all disclosed in my said Letters Patent, and may be varied as occasion demands.

In accordance with the present invention, the arm $r$ is revoluble about a pivot member which is readily engageable in and disengageable from the bottom from without the drum, to permit cleaning. As shown, the inner extremity $i$ of the arm is fixed as by rivets 6 to an angle piece 7 through the unthreaded shank portion 13 of which a pivot bolt 9 passes. The shank passes upwardly through an opening $o$ formed centrally through the bottom 2, and is threaded at its slightly enlarged lower end portion $h$ for engagement in a nut 10, which is secured as by welding to the outer face of the bottom and thus holds the bolt in place. Preferably, a fiber washer 12 is placed between the head 11 and the nut 10. The shank is also preferably threaded at its upper end portion $g$ for engagement with a nut 13 to prevent disassembly of the agitator from the bolt.

It will thus be seen that the agitator and bolt may both be readily removed and disassembled from the drum when the latter is to be cleaned and polished, leaving a peep-hole at the bottom for inspecting the drum while cleaning.

Having thus described an embodiment of this invention, it is evident that it is susceptible of various changes and modifications without departing from its spirit or scope as defined by the appended claims.

What I claim is:

1. In combination with a drum having a metal bottom, an agitator comprising an arm revoluble about the axis of the drum adjacent to its bottom, a nut secured to the outer face of the bottom, and a bolt on which the inner end of said arm is pivoted passing upwardly through said bottom and in threaded engagement with said nut adjacent to its head.

2. In combination with a drum having a metal bottom, an agitator comprising an arm revoluble about the axis of the drum adjacent to its bottom, a nut welded to the outer face of the bottom, a bolt on which the inner end of said arm is pivoted passing upwardly through said bottom and in threaded engagement with said nut adjacent to its head, a fiber washer between said head and nut, and a revoluble nut mounted on the end portion of said bolt which projects into the drum.

3. In combination with a drum, an agitator comprising an arm revoluble about the axis of the drum adjacent to its bottom, a pivot member on which the inner end of said arm is pivoted passing through and engaged in said bottom, said member being engageable in and disengageable from said bottom from without said drum, and means removably mounted on said pivot member for preventing unshipping of said arm from said pivot member.

4. In combination with a metal drum, an agitator comprising an arm revoluble about the axis of the drum adjacent to its bottom, a nut welded to said bottom at substantially its central point, a bolt passing upwardly through said nut and bottom and having a threaded portion adjacent its head in threaded engagement with said nut, said bolt having a reduced portion within the drum on which the end of said arm may swing, and a retaining nut threaded to the upper end of said reduced portion, said nut preventing accidental unshipping of said arm from said bolt.

In testimony whereof I have affixed my signature.

CHARLES E. FARRINGTON.